Oct. 23, 1962 H. V. BAMFORD ETAL 3,059,403
HAY TEDDING AND WINDROWING MACHINE
Filed July 13, 1960 2 Sheets-Sheet 1
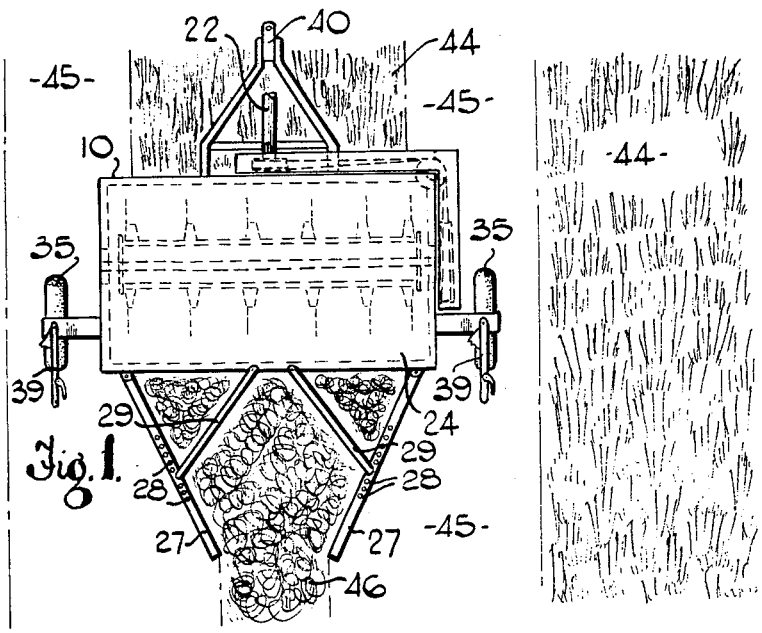
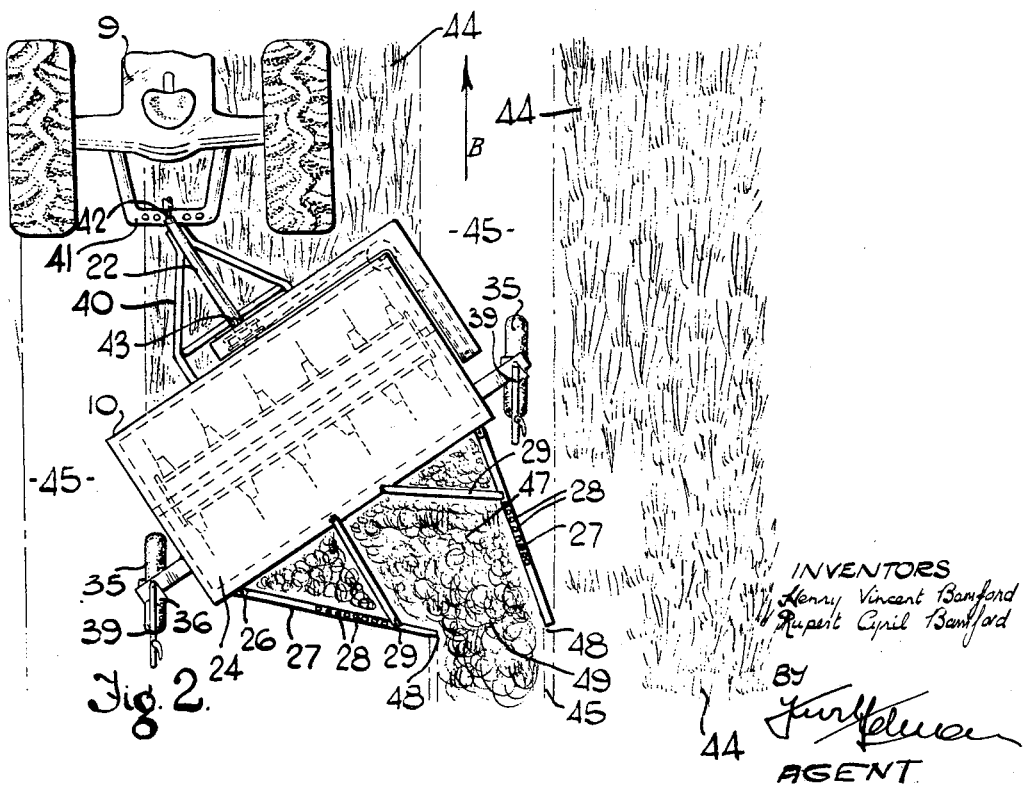
INVENTORS
Henry Vincent Bamford
Rupert Cyril Bamford
BY
AGENT Oct. 23, 1962  H. V. BAMFORD ETAL  3,059,403
HAY TEDDING AND WINDROWING MACHINE
Filed July 13, 1960  2 Sheets-Sheet 2
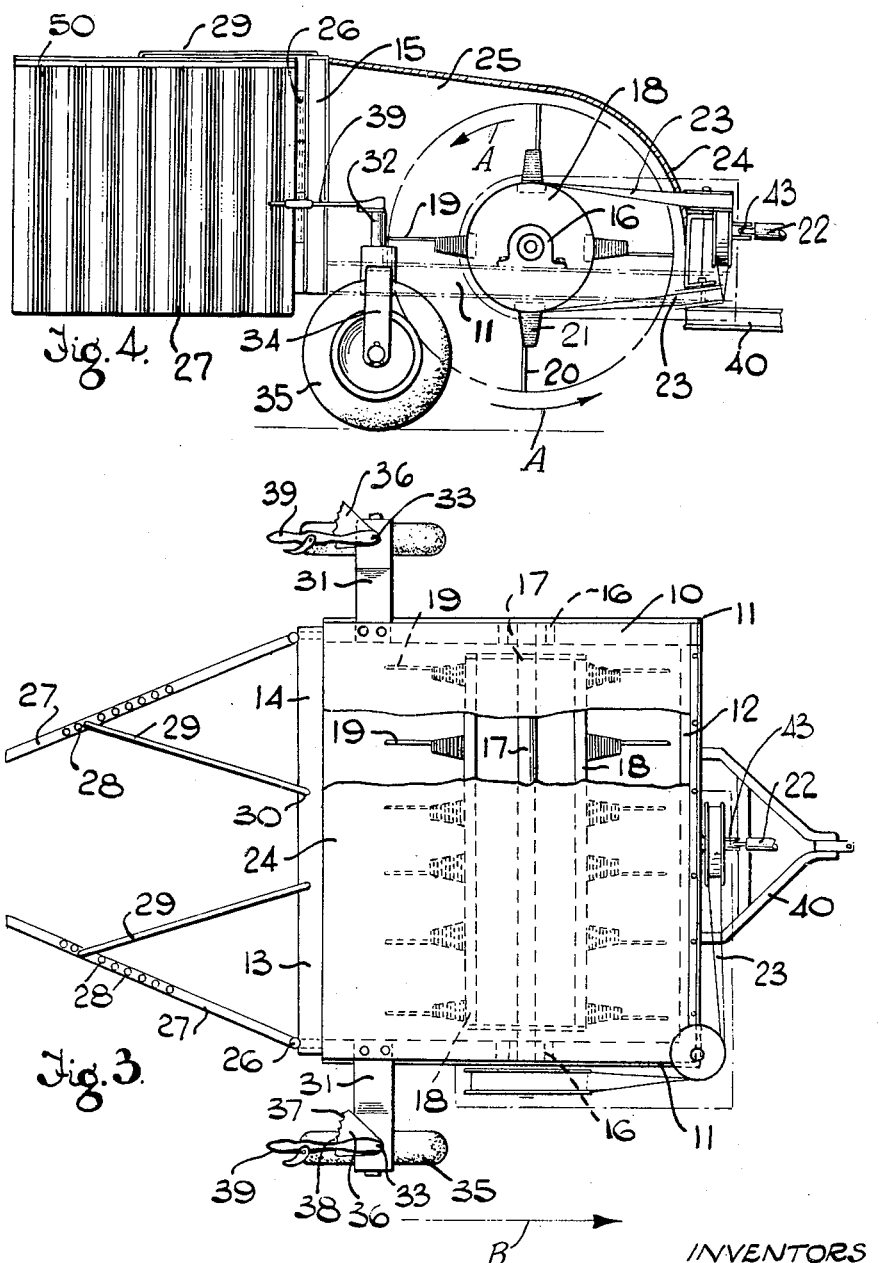
INVENTORS
Henry Vincent Bamford
Rupert Cyril Bamford
BY 
AGENT United States Patent Office 3,059,403
Patented Oct. 23, 1962

3,059,403
HAY TEDDING AND WINDROWING MACHINE
Henry Vincent Bamford and Rupert Cyril Bamford, Uttoxeter, England, assignors to Bamfords Limited, Uttoxeter, England, a British company
Filed July 13, 1960, Ser. No. 42,650
Claims priority, application Great Britain July 15, 1959
8 Claims. (Cl. 56—366)

This invention relates to agricultural machines and is concerned with hay making machines which are of the kind comprising a number of crop engaging members mounted for rotation about an axis extending transversely to the direction of advancement of the machine over the ground, the crop engaging members extending in a direction along said axis of rotation and transversely of the direction of advancement of the machine over the ground, means for rotatably driving said crop engaging members, for example, from the power take-off shaft of the tractor, or from ground wheels on the machine, and the crop engaging members being adapted to operate on a previously cut or turned swath, or windrow lying on a strip of ground so as to perform a tedding operation on the crop to facilitate the drying of the same by the sun and wind.

Hitherto in machines of the foregoing kind, the crop engaging members have usually been mounted for rotation about an axis which is perpendicularly transverse to the direction of advancement of the machine over the ground so that the crop lying in the swath or windrow which is engaged by the crop engaging members is delivered back on to the strip of ground previously covered by the swath or windrow in question, and which strip is consequently often in a damp or wet condition so that the drying operation desired may be impaired.

One of the objects of the invention is to provide an improved arrangement in which the foregoing disadvantage of existing machines as above referred to is avoided.

A further object of the invention is to provide a hay making machine of the kind specified in which the crop, instead of being delivered back on to wet or damp ground, is delivered on to the strips of dry ground in between the swaths or windrows which are being operated on, so that the drying operation is facilitated.

A further object of the invention is to provide a hay machine of the kind specified in which provision is made for varying the extent to which the crop displaced by the crop engaging members is deflected laterally.

The invention is illustrated in the accompanying drawings, wherein:

FIGURE 1 is a plan view illustrating one form of hay making machine which embodies the present invention;

FIGURE 2 is a plan view of the machine depicted in FIGURE 1, the machine being depicted in its preferred operative position in accordance with the present invention;

FIGURE 3 is a plan view to an enlarged scale of the machine depicted in FIGURE 2, part of the machine casing being broken away; and FIGURE 4 is a side elevation of the machine depicted in FIGURE 3 part of the machine casing being broken away.

Referring firstly to FIGURE 3 of the drawings, the hay making machine there illustrated comprises a frame 10 consisting of two spaced parallel side members 11 joined together at their forward ends by a transversely extending front member 12, the rear ends of the side members 11 being joined by a baffle supporting frame 13 of inverted channel configuration consisting of a top member 14 and a pair of vertical side members 15, the lower ends of which are joined to the rear ends of the horizontal side members 11.

The two horizontal side members 11 are provided with bearings 16 which support for rotation, about a horizontal axis, opposite ends of the axle portion 17 of tine drum 18.

This tine drum 18 is provided with a number and, as illustrated, four transversely extending rows of tines 19 which constitute crop engaging members.

As clearly shown in FIGURE 3, these crop-engaging members are spaced apart in a direction parallel to, i.e. along the axis of rotation of the tine drum, namely the axis of tine drum axle 17, so that each row of tines extends along the length of said axis of rotation.

Each tine is formed of a length of spring steel wire, the outer portion 20 of which is adapted to engage with the crop, with the inner portion formed as a closely coiled spring 21 anchored to the tine drum and providing a flexible and resilient connection between the outer or operative portion 20 of each tine and the drum.

The drum is adapted to be rotated in the direction illustrated by the two arrows A in FIGURE 4 so that the underside of the drum moves forwardly in relation to the direction of advancement of the machine over the ground, as illustrated by the arrow B in FIGURES 2 and 3, and for this purpose the front end of the machine is provided with a forwardly extending drive shaft 22, the front end of which is adapted in the known manner to be connected to the power take-off shaft of a propelling tractor, part of which tractor is depicted at 9 in FIGURE 2. The drive shaft 22 is connected through a step-down belt drive 23 to the drum 18.

The frame 10 supports a hood 24 which, from a position immediately in front of the forward side of the drum 18, including the tines thereof, extends upwardly and rearwardly across the top of the drum so that the rear edge of the upper part of the hood is secured to the top member 14 of frame 13.

The hood is provided at each side with a dependent side portion 25, the arrangement being such that the hood is open at a position to the rear of the tine drum 18.

The two dependent side members 15 each have hinged thereto about a vertical axis, as indicated at 26, a baffle 27. The two baffles together constitute a crop deflecting element and these two baffles are so arranged as to converge towards one another in a direction rearwardly of the machine, i.e. in a direction opposite to the direction of advancement as denoted by the arrow B in FIGURE 3.

Such rearward inclination of each baffle 27 is independently adjustable by providing the upper edge of each baffle with a series of holes 28 adapted to receive detachably the rear end of a corresponding stay 29. The front end 30 of this stay is pivoted about a substantially vertical axis to the top member 14 of frame 13.

Each of the side members 11 of the frame 10 is provided adjacent its rear end with a substantially horizontally outwardly extending ground wheel supporting bracket 31. Each bracket carries on its upper side an upstanding tube 32 which supports for pivotal movement therein, i.e. about a substantially vertical axis a stem 33 carrying a ground wheel supporting fork 34, each fork supporting one of a pair of freely rotatable ground wheels 35.

The upper end of each tube 32 carries a quadrant plate 36 of known form, having a series of notches 37 for engaging with a detent 38 mounted displaceably in the known manner upon an arm 39 provided on the upper end of each stem 33.

The arrangement is such that the planes of rotation of each of the two ground wheels 35 can thereby be adjusted into a position in which they are perpendicular to the axis of rotation of the tine drum 18. Alternatively, as shown for example in FIGURES 1 and 3 of the drawings, the ground wheels 35 may be adjusted to a position in which, while still mutually parallel, they are now inclined to the axis of rotation of the tine drum, as shown in FIGURE 2.

The direction of advancement of the machine over the ground will be parallel to the mutually parallel planes of rotation of the ground wheels. It follows that in this inclined position as depicted in FIGURE 2, the axis of rotation of the tine drum, i.e. the axis of rotation of the crop engaging members provided by the tines 19 is now inclined to a direction which is at right angles, i.e. perpendicularly transverse to the direction of advancement of the machine over the ground as denoted by the arrow B in FIGURE 2.

The lever and quadrant adjusting mechanism 39, 36, for varying the inclination of the plane of each ground wheel to the axis of rotation of the tine drum is adapted to permit of the ground wheels being disposed at various inclinations to said axis of rotation. Thus the axis of rotation of the crop engaging members can be disposed at various oblique angles to the direction of advancement of the machine.

This lever and quadrant mechanism is an example of one of a number of arrangements which may be provided for securing each ground wheel at a number of different inclinations to the axis of rotation of the crop engaging members.

The front end of the machine is provided with the usual draw-bar 40, the front end of which has the usual articulated connection to the tractor draw-bar 41. The drive shaft 22 incorporates a known form of universal joint connection 42, 43, at its front and rear end. The arrangement permits of the machine being pulled alone behind the tractor in the inclined position depicted in FIGURE 2.

In operating the machine in accordance with the invention in the manner depicted in FIGURE 2, the two ground wheels 35 would be adjusted by the lever and quadrant mechanism 39, 36. This adjustment is such as to dispose the axis of rotation of the tine drum 18, i.e. crop engaging members 19, at an inclination, conveniently of the order of 30°, to a direction perpendicularly transverse to the plane of rotation of the ground wheels, as clearly shown in FIGURE 2. The machine is now advanced in this position along a swath 44 on which it is desired to perform a tedding operation.

In practice there will be a number of parallel swaths 44 of grass or hay lying each on a corresponding strip of ground with a space 45 between adjacent swaths. Such space is provided in the known manner by the swath board as normally provided on the outer end of the mower knife. Since this strip of ground 45 between adjacent swaths 44 is uncovered, it will, except during or immediately after rain, be in dry condition.

The crop engaging members 19 during their engagement with the crop will tend to displace this in a direction parallel to their planes of rotation, i.e. in a plane perpendicular to the axis of rotation of the tine drum 18. The crop which is picked up by the forwardly rotating tines on the underside of the drum will be lifted and delivered rearwardly by the tines on the upper side of the drum in the direction in which the tines at the upper side of the drum are momentarily advancing. Accordingly, instead of the crop being delivered in a purely rearward direction as shown at 46 in FIGURE 1, as has hitherto been customary with prior art machines, the crop is delivered in a lateral direction towards one lateral side of the machine as well as in a rearward direction, as generally indicated at 47 in FIGURE 2, ie. in a direction towards the laterally adjacent uncovered or dry strip of ground 45.

The precise amount by which the crop is delivered in this lateral direction is substantially controlled by the two baffles 27 which constitute a crop deflecting element against the inner sides of which the crop is displaced in the said lateral direction. As shown in FIGURE 2, these two baffles 27 are relatively adjusted about their said hinge 26 as is permitted by the disengageable stays 29 and holes 28 such that the rear vertical edges 48 of each of the two baffles are spaced transversely apart by a distance slightly less than the width of the ground strip 45, which width is commonly of the order of 15" to 18".

The baffle adjustment and the direction of advancement of the machine is so arranged that, as clearly shown in FIGURE 2, the opening 49 between the rear edges 48 of the baffles is aligned with the uncovered strip of ground 45. This ensures that at any rate substantially the whole of the crop is deposited on this dry strip of ground as opposed to being deposited on ground which, prior to the tedding operation, has been covered by a swath so as still to be in a damp or wet condition.

Thus, the crop in each swath 44 is subjected to a tedding operation so as to separate the individual lengths of grass or hay in accordance with normal tedding practice. Also the tedded crop is delivered on to dry ground whereby the drying thereof is facilitated.

Further, with the preferred construction described the rearwardly converging baffles 27 constituting the crop deflecting element serve to ensure that the crop is re-deposited on to the ground in the form of a relatively narrow windrow. Through such windrow, by reason of its narrow width and its aerated condition, the wind can readily penetrate to facilitate the drying operation.

The overall width of the machine frame will be made only slightly greater than the customary swath width as left by the standard length of mower knife, usually five feet, which, by the provision of the aforementioned swath board, customarily leaves a swath width 44 of the order of three feet six inches to three feet nine inches. The two ground wheels extend only by a short distance beyond this width on either side of the machine so as to be adapted, as clearly shown in FIGURE 2, to run on uncovered ground instead of on the crop itself.

During operation the two ground wheels 35 are locked by the lever and quadrant adjusting mechanism against turning about a vertical axis, with their planes of rotation mutually parallel. Thus the machine is effectively guided against lateral movement despite its articulated connection to the rear end of the tractor behind which it is drawn along.

In order to assist the aeration of the tedded crop, the baffles 27 may be formed, as shown in FIGURE 4, with a series of vertically extending corrugations 50. The crop adjacent the baffles is delivered against these corrugations so as thereby to be further deflected and consequently aerated.

Although we have illustrated a construction in which the machine is adapted to deliver the crop in a lateral direction to the righthand side of the machine as this advances along, it should be understood that by suitably arranging the lever and quadrant mechanism 39, 36, the axis of rotation of the crop engaging members may be inclined oppositely from the position illustrated so that the machine is then adapted to deliver the crop in a lateral direction to the lefthand side of the machine, i.e. the reverse of that depicted in FIGURE 2.

What we claim then is:
1. In a hay tedding machine, in combination,

(a) a frame member;
(b) two wheel means spacedly mounted on said frame member for rotation about respective axes extending transversely of the path of wheeled frame member movement;
(c) means for moving said frame member on said path in a predetermined longitudinal direction;
(d) drum means mounted on said frame member and having an axis obliquely inclined relative to said predetermined direction;
(e) actuating means for actuating rotation of said drum means about said axis thereof;

(f) a plurality of tine members on said drum means in axially and circumferentially spaced relationship for engagement with an elongated windrow of hay on said path, said tine members when engaging said windrow being moved relative to the frame member in said predetermined direction by rotation of said drum means for discharging the engaged hay; and (g) deflector means on said frame member for deflecting said discharged hay to a point laterally outside said windrow.

2. In a machine according to claim 1, said deflector means including a vertically extending deflector face located above said axis of said drum means.

3. In a machine according to claim 2, pivot means securing said deflector face to said frame member for pivoting movement about a vertically extending axis.

4. In a machine according to claim 1, said deflector means including hood means extending from an area forward of the axis of said drum means in said predetermined direction upwardly and thence rearwardly to an area upwardly and rearwardly spaced from said drum means axis, and two baffle members having respective vertically extending deflector faces located above said axis of said drum and converging rearwardly relative to said predetermined direction, the speed of rotation of said drum means being sufficient to cause discharge of said engaged hay against said hood means.

5. In a machine according to claim 4, adjusting means for varying the angle of inclination between said drum means axis and said predetermined direction.

6. In a machine according to claim 5, said adjusting means including wheel support means pivotable on said frame member in a plane extending in said predetermined direction and said common direction; and means for selectively securing said wheel support means against pivoting movement in said plane in a plurality of angularly spaced positions.

7. In a machine according to claim 6, said means for moving said frame member including hingedly articulated draw bar means.

8. In a machine according to claim 1, said deflector means including a vertically extending deflector face formed with corrugations elongated in a vertical direction.

References Cited in the file of this patent

UNITED STATES PATENTS

| | | |
|---|---|---|
| 2,502,599 | Smart | Apr. 4, 1950 |
| 2,559,862 | Ferguson | July 10, 1951 |
| 2,908,130 | Van der Lely et al. | Oct. 13, 1959 |
| 2,911,780 | Brady | Nov. 10, 1959 |
| 2,918,776 | Coultas | Dec. 29, 1959 |
| 2,966,773 | Van der Lely | Jan. 3, 1961 |